(12) United States Patent
Favro et al.

(10) Patent No.: US 11,820,609 B2
(45) Date of Patent: Nov. 21, 2023

(54) ROBOT EQUIPPED WITH A GRIPPER FOR PERFORMING A PICKING PROCESS

(71) Applicant: COMPAGNIE GENERALE DES ETABLISSEMENTS MICHELIN, Clermont-Ferrand (FR)

(72) Inventors: Gwenael Favro, Clermont-Ferrand (FR); Gregory Marcet, Clermont-Ferrand (FR); Maxime Tarrit, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 138 days.

(21) Appl. No.: 17/461,533

(22) Filed: Aug. 30, 2021

(65) Prior Publication Data

US 2021/0387817 A1    Dec. 16, 2021

(30) Foreign Application Priority Data

Feb. 23, 2021   (FR) ........................ 2101748

(51) Int. Cl.
*B65G 47/90*    (2006.01)
*B65G 43/10*    (2006.01)

(52) U.S. Cl.
CPC ............. *B65G 47/90* (2013.01); *B65G 43/10* (2013.01); *B65G 2201/0235* (2013.01)

(58) Field of Classification Search
CPC . B65G 43/10; B65G 47/90; B65G 2201/0235

USPC ........................................................ 414/751.1
See application file for complete search history.

(56) References Cited

U.S. PATENT DOCUMENTS

| | | | |
|---|---|---|---|
| 9,394,145 B2 | 7/2016 | Yada et al. | |
| 2012/0031808 A1 | 2/2012 | Cavallini | |
| 2015/0290805 A1 | 10/2015 | Morency et al. | |
| 2018/0050451 A1 | 2/2018 | Takanishi et al. | |
| 2020/0283241 A1 | 9/2020 | Quaglia et al. | |
| 2021/0233018 A1 | 7/2021 | Astier | |
| 2021/0387359 A1* | 12/2021 | Marcet | ........... B25J 13/087 |
| 2022/0055837 A1* | 2/2022 | Marcet | .......... B29D 30/0016 |

FOREIGN PATENT DOCUMENTS

| | | |
|---|---|---|
| CN | 205837747 U | 12/2016 |
| CN | 106742061 A | 5/2017 |
| CN | 206840077 U | 1/2018 |
| CN | 108527322 A | 9/2018 |
| CN | 110713019 A | 1/2020 |
| CN | 210417931 U | 4/2020 |
| CN | 112407741 A | 2/2021 |
| DE | 102019207401 A1 | 11/2020 |
| EP | 3442764 A1 | 2/2019 |
| FR | 2971237 A | 8/2012 |
| JP | 10-297768 A | 11/1998 |
| JP | 2005-297091 A | 10/2005 |

(Continued)

*Primary Examiner* — Saul Rodriguez
*Assistant Examiner* — Brendan P Tighe
(74) *Attorney, Agent, or Firm* — VENABLE LLP

(57) ABSTRACT

The invention relates to a robot (100) for performing a process of picking rubber blocks arranged in a container toward a target location. The invention also relates to a process of picking rubber blocks arranged in a container, performed by the disclosed robot (100).

12 Claims, 7 Drawing Sheets

(56) References Cited

FOREIGN PATENT DOCUMENTS

| | | |
|---|---|---|
| JP | 2009-172720 A | 8/2009 |
| JP | 2018-27581 A | 2/2018 |
| WO | 2010/057898 A1 | 5/2010 |
| WO | 2019/193272 A1 | 10/2019 |
| WO | 2020/025868 A1 | 2/2020 |

* cited by examiner

[Fig 1]
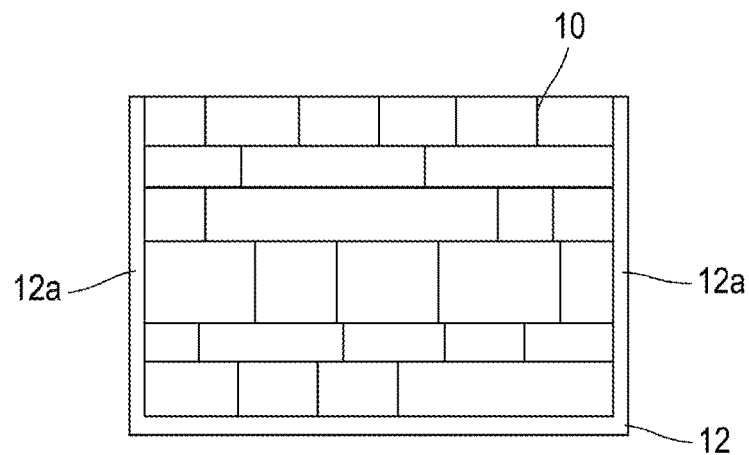
[Fig 2]
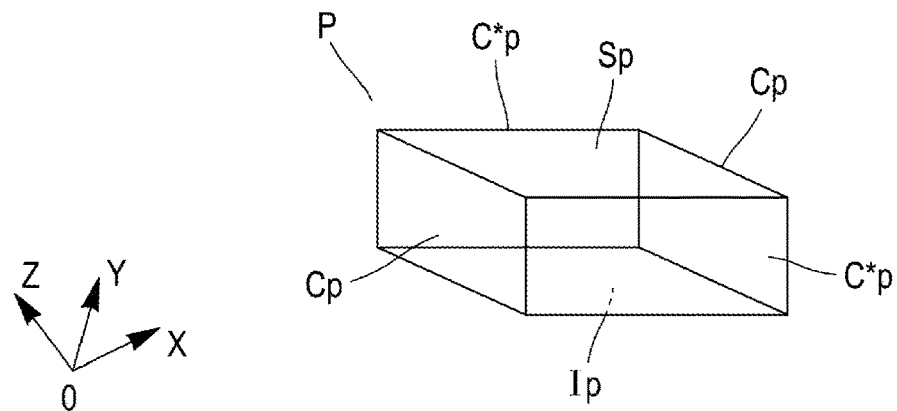
[Fig 3]
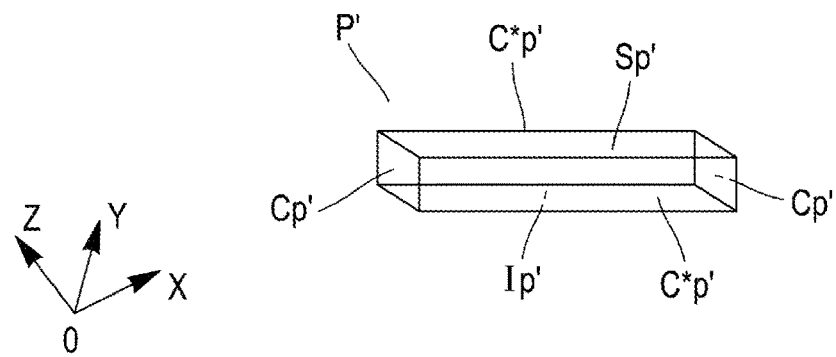

[Fig 4]
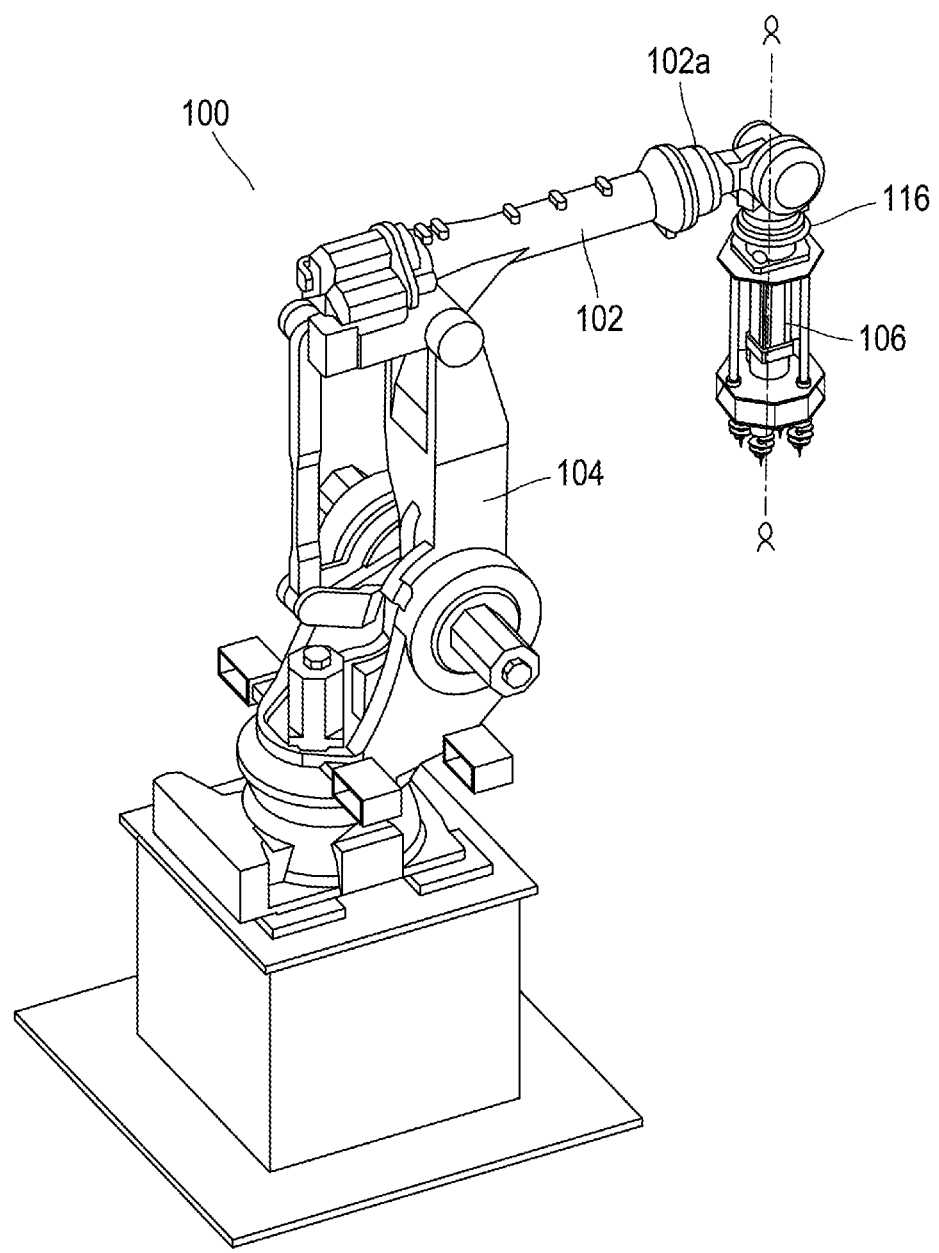

[Fig 5]
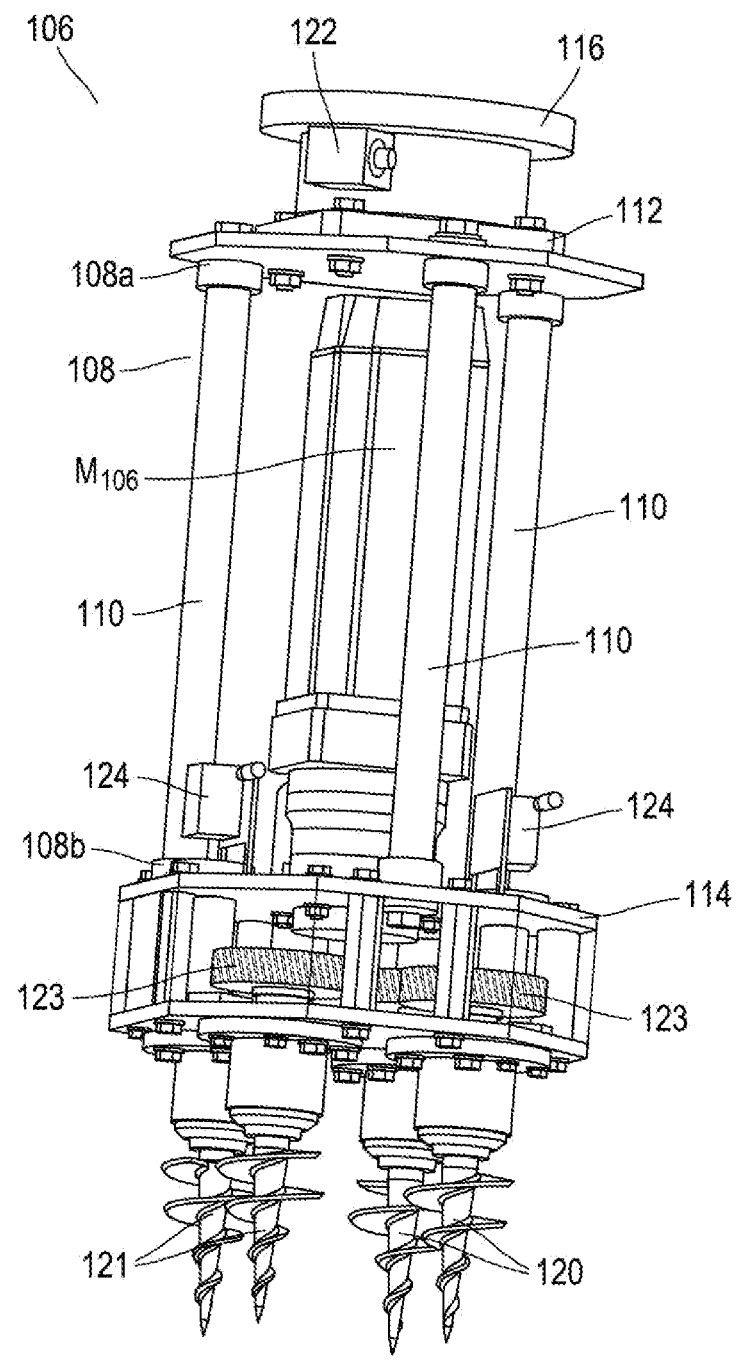

[Fig 6]
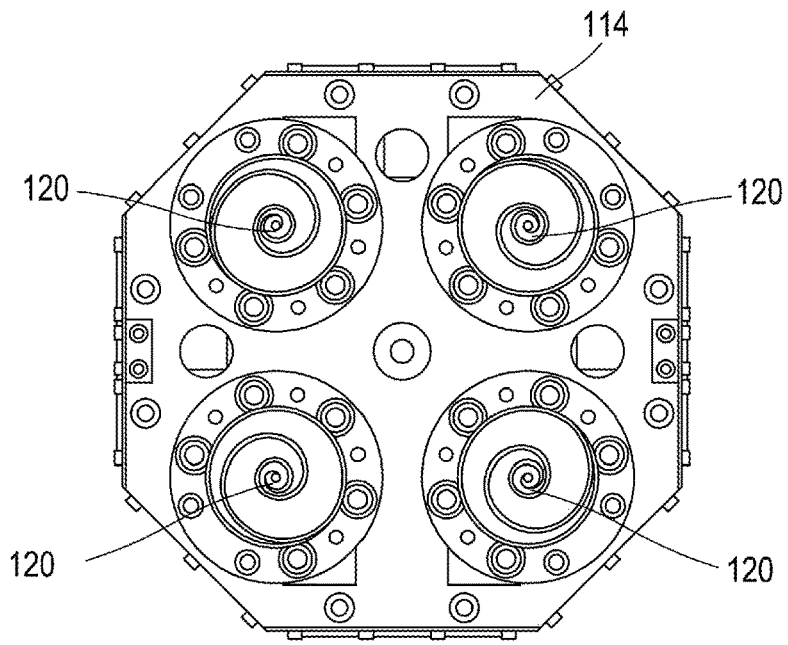
[Fig 7]
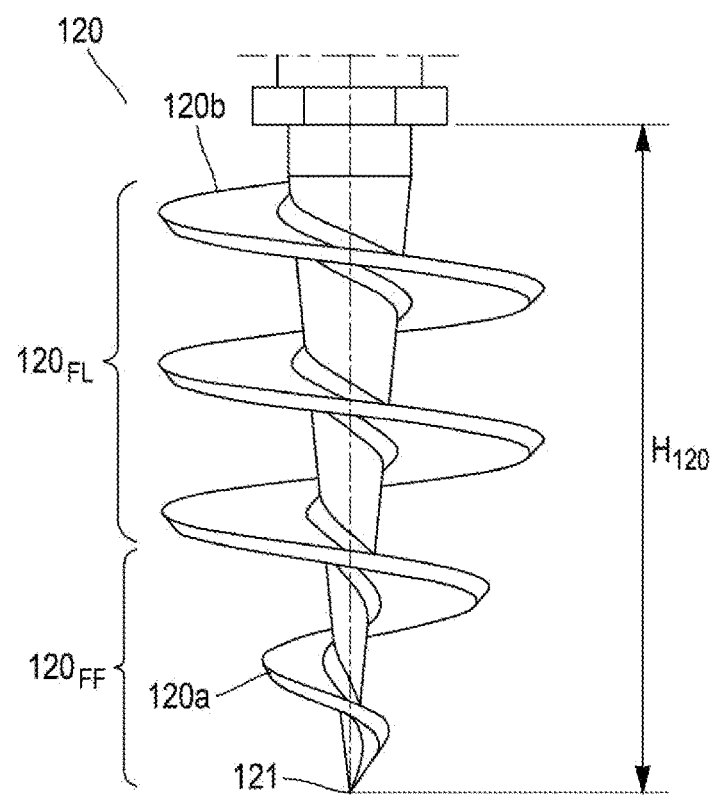

[Fig 8]
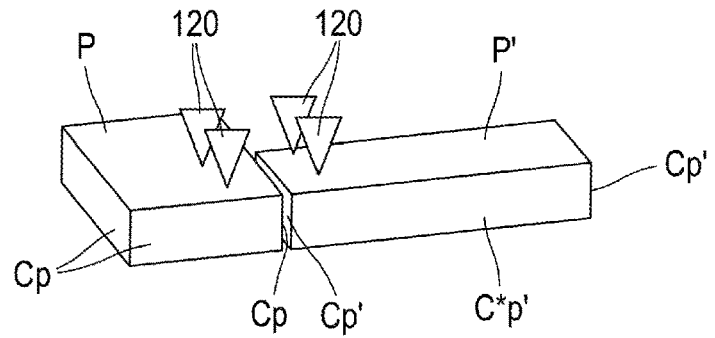
[Fig 9]
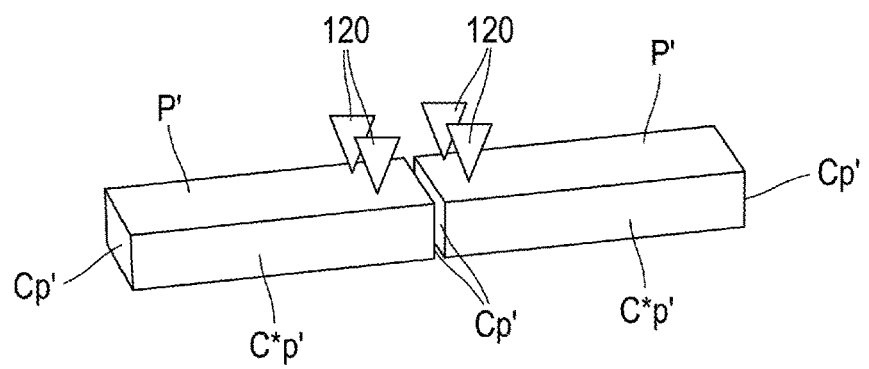
[Fig 10]
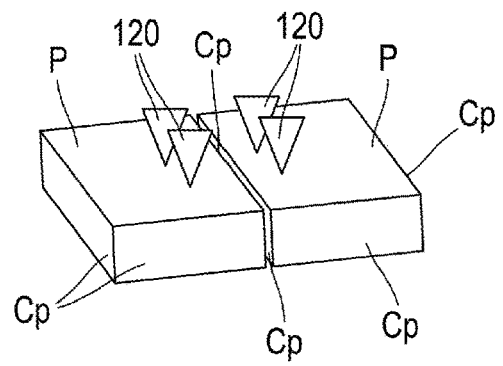

[Fig 11]
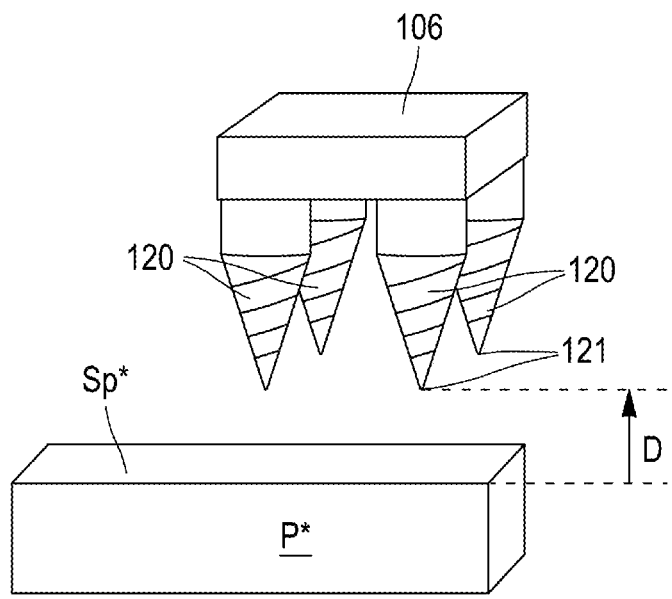
[Fig 12]
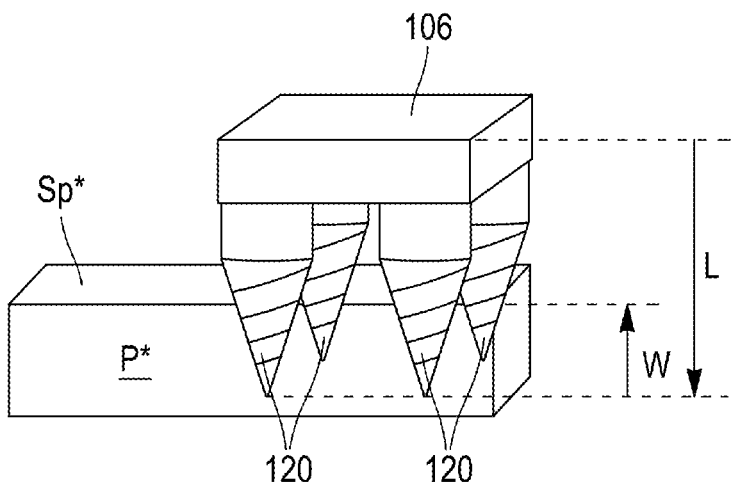

[Fig 13]
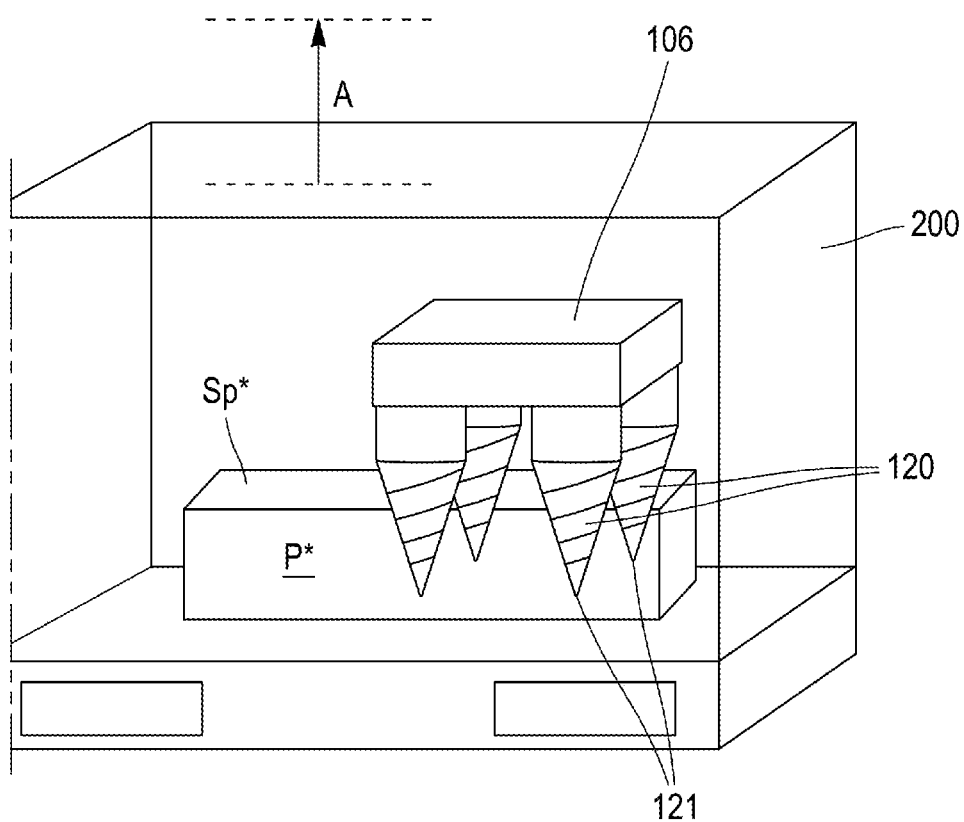

ROBOT EQUIPPED WITH A GRIPPER FOR PERFORMING A PICKING PROCESS

TECHNICAL DOMAIN

The invention relates to system for picking and arranging rubber blocks of rubber mixtures, the blocks being stored in containers supplied to robotic installations. More particularly, the invention relates to such a system incorporating a robot equipped with a gripper for performing a process of picking one or more rubber blocks arranged without prior knowledge of their arrangement in each container.

BACKGROUND

In the field of manufacturing rubber products (including tires), a rubber mixture can be selected from a variety of rubber mixtures that are mixed in different quantities and from a variety of recipes. Each rubber mixture incorporates different materials that are necessary to make the product, including, without limitation, elastomeric material(s) (e.g., natural rubber, synthetic elastomer, and combinations and equivalents thereof) and one or more ingredients, such as one or more processing agents, protective agents, and reinforcing fillers. The recipes thus require the mixing of batches of non-vulcanized rubber (natural or synthetic) in predetermined mass proportions (i.e. "dosing").

Each batch includes one or more types of rubber that, after mixing, give a rubber product the desired properties. In order to obtain the most homogeneous properties possible, a batch can be made up of different batches from different suppliers for the same type and grade of elastomer. For the same type and grade of elastomer, the properties of this elastomer can vary from one supplier to another and even from one batch to another for the same supplier. Each grade is typically supplied in blocks (or "bales") of gum (or "rubber") of predetermined weight and volume (as used herein, it is understood that the terms "gum" and "rubber" are interchangeable). There are arrangements of the rubber blocks that are grouped according to their common properties, which facilitates their handling and ensures their optimal storage in the available storage space.

Referring to FIG. 1, an embodiment of rubber block storage is shown in which one or more rubber blocks partially overlap one another. In this type of storage, the rubber blocks 10 are stacked in a container 12 with side portions 12a. It is understood that the term "container" includes crate(s) and/or other equivalent container(s) capable of performing an automated process of picking the rubber blocks, the container being selected from, for example, pallets, truck bodies, chained trucks, van bodies, and their equivalents). During a picking process, one or more rubber blocks are stored without prior knowledge of their arrangement in each container. It is understood that the term "picking" includes the functions of posing and picking up the rubber blocks arranged (or "sorted") in a container or other dedicated space, as well as the target arrangement of the rubber blocks.

Solutions exist for performing steps of extracting and removing a rubber block that are part of a picking process. For example, U.S. Pat. No. 9,394,145 discloses a method of transporting rubber bales performed by a gripping device that grabs the rubber bales with a claw to transport them. When lifting is performed, the gripping device transports each rubber bale by firmly gripping a top surface of the rubber bale with claws having sharp tips. A claw driving mechanism is provided on a frame of the gripper to pierce the upper surface of the rubber bale with the claw. A contact sensor disposed on the claw detects a contact made with the rubber bale, and a safety mechanism of the claw cancels the non-operational state of the claw by a contact signal generated by the contact sensor when in contact with the rubber bale. The gripper is coupled to a transport mechanism that moves the gripper laterally and a lifting mechanism including a hydraulically driven lifting cylinder.

The publication JP2005297091 discloses a device for stacking rubber blocks on a pallet using an automated transfer device. The device can move and orient a gripper having two screws that screw into, or unscrew from, the top face of a rubber block. The device may be located in a safety enclosure (or "cell") that an operator may enter on a regular basis, requiring the device to be shut down.

These types of systems are limited to perforating a single surface of the rubber block (and, in some cases, the plastic in which the rubber block is packaged), where the rubber block is made of a rubber mixture selected from a variety of rubber mixtures, including sticky mixtures with varying viscosities. The rubber blocks may be randomly arranged in the container, with any orientation possible along all three dimensions. The rubber blocks may have "flowed", and thus may be randomly deformed. As discussed by the publication JP2005297091, ". . . when the upper bale G is pulled up, the rubber bale G immediately below it tends to be pulled together . . . so only the uppermost rubber bale G can be reliably pulled up." (see paragraph 0021). In addition, the incoming containers may be of different sizes and equipped (or not) with a plastic block protection bag.

Thus, the disclosed invention combines the benefits of a robot with a specific gripper that performs a process of picking the rubber blocks regardless of their properties (e.g., harder, stickier, wrapped, unwrapped, etc.) and regardless of their orientations in the container. The disclosed invention is usable for such cells or containers where the cell is designed to handle rubber blocks of all types (variety of colors, sizes, shapes, hardness, stickiness, marking and plastic protections, variety of rubber mixtures, etc.). A system incorporating the gripper of the invention is specifically designed to be able to enter into and exit from a container by automatic handling means (for example, of the AGV/RGV type) but also by any other manual handling means.

SUMMARY OF THE INVENTION

The invention is directed to a robot for performing a process of picking rubber blocks arranged in a container for a target location, characterized in that the robot includes:
   a gripping device supported by an elongated pivotable arm and extending from the elongated arm to a free end;
   a gripper disposed at the free end of the gripper device along a longitudinal axis, the gripper including:
      a housing having a predetermined length between an attachment end and a gripping end and including supports that extend between an attachment platform disposed at the attachment end and a functional platform disposed at the gripping end;
      one or more screws installed in the functional platform such that each of the screws can be rotated, each screw having a predetermined height that extends between a bottom portion at the end of the screw, where an extremity of the screw is disposed to pierce an outer surface of the target rubber blocks, and an opposite top portion; and measuring means for verifying the positioning height of a target rubber block picked up by the gripper during a picking process;

such that the gripper can perform the gripping of a target rubber block when the robot is set in motion during a picking process.

In some embodiments of the robot, the robot further includes one or more weighing sensors having the function of weighing the one or more rubber blocks picked up by the gripper during a picking process.

In some embodiments of the robot, the gripper measurement means includes laser range finder(s) that detect the presence or absence of a target rubber block gripped by a corresponding screw and that measure the screw-in height of a rubber block by determining the depth of the screw inserted therein.

In some embodiments of the robot, each screw includes an area of low threads on the bottom part of the screw and an area of high threads on the top part of the screw.

In some embodiments of the robot, the robot further includes at least one motor that controls the speed and direction of rotation of the screws.

In some embodiments of the robot, the gripper attachment end includes an adapter integrated with the attachment platform that allows for removable attachment of the housing to the robot.

The invention also relates to a process of picking the rubber blocks arranged in a container that is performed by the robot of the invention. The process includes the following steps:
- a step of approach of the robot toward a target rubber block identified for picking by the gripper, during which the gripper is controlled to come close to an outer surface of the target rubber block and the screws rotate in a predetermined rotational direction to perform retention of the target rubber block by the screws;
- a step of determining a parameter or parameters of a target rubber block in an arrangement of rubber blocks; and
- a step of retaining the target rubber block during which the gripper is continuously moved until the extremity of the screw pierces the outer surface of the target rubber block to retain it;
- a step of extracting the target rubber block from the container, during which the retention of the target rubber block is maintained, and during which the load cells determine the weight of the target rubber block picked by the gripper; and
- a step of posing the target rubber block in a target location, this step including:
  - a step of transporting the target rubber block to the target location; and
  - a releasing step during which the screws rotate in a predetermined direction of rotation to effect release of the target rubber block from the screws when the target rubber block is successfully posed in the target location.

In some embodiments of the process, during the step of releasing the target rubber block, the measuring means measures the depth of the piercing performed until an intended piercing depth is reached, where a stop of the rotation of the screws is effected.

In some embodiments of the process, the step of extracting the target rubber block includes a step of vertically pulling the target rubber block away from the other rubber blocks arranged in the container.

In some embodiments of the process, the step of vertically pulling the block includes:
- a peeling step, during which the target rubber block picked by the gripper is removed in a direction normal to the outer surface of an adjacent rubber block; and/or
- a motion control step, during which a perpendicular movement of the gripper is made to tip the target rubber block gripped by the gripper.

In some embodiments of the process, the posing step includes a gripper exit step performed after the target rubber block is posed in the target location and simultaneously with the screw release step.

In some embodiments of the process, during the determining step, the rubber block parameters are determined from a reference of the rubber block dimensions.

Other aspects of the invention will become apparent from the following detailed description.

BRIEF DESCRIPTION OF THE DRAWINGS

The nature and various advantages of the invention will become more apparent from the following detailed description, in conjunction with the accompanying drawings, in which the same reference numerals designate identical parts throughout, and in which:

FIG. 1 represents a schematic view of one embodiment of rubber block storage.

FIGS. 2 and 3 represent schematic perspective views of known embodiments of rubber blocks.

FIG. 4 represents a perspective view of an embodiment of a robot that performs a process of picking rubber blocks arranged in a container.

FIG. 5 is a front perspective view of an embodiment of a gripper of the robot of FIG. 4.

FIG. 6 is a bottom view of the gripper of FIG. 5.

FIG. 7 is a front view of an embodiment of a screw of the gripper of FIG. 5.

FIGS. 8, 9, and 10 depict examples of the locations of the gripper screws relative to the target rubber blocks identified for picking by the robot of FIG. 4.

FIGS. 11, 12, and 13 represent steps of an embodiment of a picking process of the invention.

DETAILED DESCRIPTION

Referring now to the figures, and considering the type of rubber block storage that best utilizes the available storage space, it is necessary to consider the geometry of the rubber blocks being transported. FIGS. 2 and 3 represent schematic views of embodiments of a rubber block P, P' that includes, in a representative manner, an outer surface having a top surface $S_P$, $S_{P'}$, an opposite bottom surface $I_P$, $I_{P'}$, two opposite sides $C_P$, $C_{P'}$ that define a length of the rubber block, and two opposite sides $C_{*P}$, $C_{*P'}$ that define its width. The constitution of a rubber block P, P' is typically described by a representation of its constituents in a meridian plane, i.e., a plane containing the parallel X-axis, the perpendicular Y-axis, and the Z-axis perpendicular to any meridian plane. It is understood that each of these parameters may be expressed in equivalent known length measurements (e.g., millimeters (mm) or inches (in)). It is understood that the geometries of the rubber blocks P, P' are given as examples, with other geometries being addressed (e.g., rubber blocks in a fluid form).

Referring now to FIGS. 4 to 7, in which the same numbers identify identical elements, FIG. 4 depicts an embodiment of a robot 100 of the invention for performing a process of picking rubber blocks arranged in a crate (or in an equivalent container as described above). The robot 100 may be part of a robotic system that controls the allocation and transport of rubber blocks in a rubber product production facility. It is understood that the term "picking" includes the functions of posing and picking up arranged (or "sorted") rubber blocks from a crate, truck, container, or other dedicated space, as well as the target arrangement of the rubber blocks. It is understood that the term "target rubber block" (singular or plural) includes a rubber block that is present in the physical environment of the robot 100 and is identified for pickup during a picking process of the invention performed by the robot 100. It is understood that the term "target location" (singular or plural) includes a dedicated space where the target rubber blocks picked up by the robot 100 will be arranged (e.g., a belt, conveyor, crate, rack, etc.). The term "target arrangement" (singular or plural) includes a desired arrangement for the rubber blocks arranged in a target location (e.g., "stack storage").

The robot 100 performs an unstacking (and transporting) process that may incorporate a method for calculating the shape of a target rubber block. In some embodiments, the calculation method is based on an employed algorithm that analyzes the outer surface of the rubber block and determines the ideal area to stably pick up the target rubber block. Thus, the robot 100 can attain continuous improvement in the selection of rubber blocks for picking.

The robot 100 is useful in spaces where rubber blocks are arranged (arranged in either known or unknown ways) and in which their target arrangements must be attained.

It is understood that the robot 100 may operate in multiple physical environments without knowledge of their parameters in advance.

It is understood that the robot 100 may include a static robot or a mobile robot. By "mobile" it is understood that the robot 100 may be set in motion either by integrated motion means (e.g., integrated motor(s)) or by non-integrated motion means (e.g., stand-alone mobile cart(s) or other equivalent mobile means). It is understood that the robot 100 may be attached to a floor, ceiling, wall, or any support that allows the picking process of the invention to be performed by the robot 100. It is understood that the robot 100 may be a conventional industrial robot or a collaborative robot or even a delta or cable robot. In one embodiment, the robot 100 may be of the "Cartesian" type that allows the control of its movement in cases where the containers are positioned in a corresponding manner.

Referring again to FIG. 4 and further to FIGS. 5 and 6, the robot 100 includes a gripping device 102 supported by an elongated pivotable arm 104. The gripping device 102 extends from the elongated arm 104 to a free end 102a where a gripper 106 of the invention is disposed along a longitudinal axis 1-1 (see FIG. 4). The robot 100 is set in motion so that the gripper 106 can pick up of a target rubber block during a picking process performed by the robot (as described below and as shown with respect to FIGS. 11-13). The initial positioning of the robot 100 and the initial orientation of the gripper 106 may be determined from data obtained via image acquisition and the physical environment in which the robot 100 operates.

One embodiment of the gripper 106 includes a housing 108 having a predetermined length between an attachment end 108a and a gripping end 108b. The housing 108 includes supports 110 that extend between an attachment platform 112 disposed at the attachment end 108a and a functional platform 114 disposed at the gripping end 108b. By way of example, three supports 110 are shown in FIG. 5, but it is understood that the number of supports may be variable (e.g., depending on the length of the housing 108). The attachment end 108a may include an adapter 116 integrated with the attachment platform 112 that allows for removable attachment of the housing to the robot 100. Attachment of the housing 108 to the robot 100 may be accomplished by screwing the adapter 116 to the free end 102a of the gripping device 102 (accomplished, for example, by a known screw or screws). It is understood that attachment of the housing 108 to the robot 100 may be achieved by known equivalent attachment means(s) (including, without limitation, welding, gluing, threading, and the like).

The gripper 106 includes one or more screws 120 installed in the functional platform 114 such that each of the screws can be rotated. The screws 120 may be integral, or they may be removable, with respect to the functional platform 114. The functional platform 114 allows the screw(s) 120 to be installed in a substantially equilateral geometry (e.g., a substantially square shape) (see FIG. 6).

The speed and direction of rotation of the screws 120 are controlled by a motor $M_{106}$ supported in the housing 108 by the functional platform 114. The motor $M_{106}$ manages the relationship between the rotational speed and pitch of a screw with the linear advance of the robot 100 to allow the screw to be screwed into the target rubber block without tearing the rubber block. In one embodiment, the motor $M_{106}$ includes a commercially available motor that allows the speed and/or linear position of each screw to be synchronized with respect to a target rubber block (for example, a so-called "brushless" type motor). Whatever the configuration of the motor $M_{106}$, it is dimensioned to attain a well-matched pickup speed and an optimal pose according to the shape and dimensions of the target rubber block. In the embodiment shown, the motor $M_{106}$ includes a geared motor incorporating gears 123 to minimize the weight of the gripper 106 and the size of the robot 100 carrying it.

Referring again to FIGS. 4 through 7, each screw 120 may be selected from known screws, including conical-type screws (not shown) and "endless" or "corkscrew" type screws (see FIGS. 5 and 7). Referring to FIG. 7, each screw 120 includes a predetermined height $H_{120}$ that extends between a bottom portion 120a at the end of the screw, where one extremity 121 of the screw pierces the outer surface of the target rubber blocks, and an opposite top portion 120b, where the rotational speed and linear motion of the screw is controlled. The height $H_{120}$ of the screw 120 is adaptable to the thickness of the target rubber block.

In the embodiment shown, the screw 120 includes a low height threaded area $120_{FF}$ on the bottom portion 120a allowing, with low penetration, the picking of rubber blocks having harder rubbers while limiting picking torque. The screw 120 also includes a zone of high threads $120_{FL}$ on the upper part 120b allowing, with a high screwing depth, to pick rubber blocks having softer rubbers, while ensuring a high tensile strength. This configuration makes it possible to extract the rubber blocks very quickly with picking forces proportional to the extraction speed. Thus, the gripper 106 achieves a good control on the pulling of the rubber blocks according to their hardness and weight. This configuration of the screw 120 also brings other advantages such as a dimensioning of an actuator of small size (such as, for example, the motor $M_{106}$), allowing energy savings, heat limitation in the case of fast cycles and the reduction of the efforts of penetration and retention.

It is understood that several models of the screws 120 can be put in reserve and can be used by the robot 100. The robot 100 can select the necessary screws to be installed on the gripper 106 based on the parameters of the current picking cycle. One or more screws 120 can be machined as needed, and the machined screws can be used together (or combined) with the screws being used. Thus, the invention provides adaptability to the robot 100 (and particularly to the gripper 106) for processing rubber blocks regardless of their parameters or shapes.

The number of screws 120 is adjustable to enable quick mounting and dismounting of the screws as needed for the process of picking the target rubber block. One or more screws 120 may be installed at the gripper 106 to optimize its picking ability (e.g., to match the grip to the dimensions of the target rubber block), to optimize the holding force of the target rubber block, and to have the ability to pick one or more rubber blocks at a time with an adjustable number of screws. FIGS. 8, 9, and 10 depict possible locations of the screws 120, arranged in a substantially quadrilateral shape. This shape allows for simultaneous picking of a pair of rubber blocks P,P' including a substantially square rubber block P with lateral sides $C_P$ and a substantially rectangular rubber block P' with a pair of opposing lateral sides $C_{P'}$ and a pair of opposing longitudinal sides $C^*_{P'}$. The gripper 106 can be moved so that two screws 120 can pierce the rubber block P and the other two screws 120 can pierce the rubber block P' at the same time (e.g., in the case where a lateral side $C_P$ of a rubber block P is aligned along a lateral side $C_{P'}$ of a rubber block P' as depicted in FIG. 8, in the case where lateral sides $C_{P'}$ of a pair of rubber blocks P' are aligned as shown in FIG. 9, and in the case where lateral sides $C_P$ of a pair of rubber blocks P are aligned as shown in FIG. 10). It is understood that the arrangements shown in FIGS. 8 through 10 are by way of example and that other arrangements and other shapes of rubber blocks are contemplated.

Referring again to FIGS. 4 through 7, and particularly to FIG. 5, the gripper 106 further includes one or more load cells 122. In one embodiment, the load cell 122 is integrated with the gripper 106 (e.g., at the attachment end 108a as shown in FIG. 5). The load cell 122 has the function of weighing the rubber block(s) picked up by the gripper 106 during a picking process. By predicting the weight of a rubber block for extraction, and then verifying this weight, the load cell 122 ensures extraction of the rubber blocks by regulating the extraction force and speed with the control of the screw speed 120. Thus, correct dosing of the rubber blocks is achieved because the picking up and posing of the rubber blocks is well-regulated and controlled.

The gripper 106 further includes means for measuring a presence of a target rubber block and/or its positioning relative to the gripper (and particularly relative to a screw or screws 120 of the gripper). In one embodiment, the measuring means includes one or more laser range finders 124 incorporated into the gripper (for example, being installed at the functional platform 114). Each laser range finder 124 is capable of verifying the positioning height of a target rubber block picked up by the gripper 106 during a picking process (an initial height being determined, for example, by a vision system). Each laser range finder 124 verifies the pickup and extraction of a target rubber block via detection of its presence or absence relative to the corresponding screws 120. To ensure optimal pickup of a target rubber block, the laser range finder 124 also measures the piercing height of a rubber block by determining the depth of a screw 120 inserted therein. In response to the measurement data captured by the laser range finders 124, the robot 100 can manipulate the gripper 106 to tilt it so that it is positioned perpendicular to the block regardless of the tilt of the rubber block. Inserting the screws 120 into the rubber block at the same depth level thus optimizes the retention of the target rubber block.

It is understood that the robot 100 may include a sensing system that uses one or more sensors (not shown) to gather information about the physical environment around the robot. It is understood that the terms "sensor," "camera," "camera," and "optical sensor" may be used interchangeably and may refer to one or more devices configured to perform two-dimensional (2D) and/or three-dimensional (3D) image sensing, 3D depth sensing, and/or other types of sensing of the physical environment. Sensors of the sensing system incorporated with the robot 100 may be attached to at least one of the elongated arm 104 and the gripper 106 of the robot.

In a facility or system incorporating the robot 100, a vision system (not shown) may be used to detect the presence of an arrangement of rubber blocks within the field of view of a camera of the vision system, which triggers the camera to capture the image of one or more rubber blocks. In cases where a portion of the target rubber block is not visible in the image obtained by the camera, an arbitrary point may be placed at a known position relative to the sensor of the detection system (e.g., at a known horizontal distance and a known vertical distance from the sensor position).

The sensing system may thus determine information about the physical environment that may be used by a control system (which includes, for example, software for planning the movements of the robot 100). The control system could be located on the robot 100 or it could be in remote communication with the robot. In some embodiments, one or more sensors mounted on the robot 100 (including, without limitation, navigation sensors) may be integrated to form a digital model of the physical environment (including, where applicable, the side(s), floor and ceiling). Using the obtained data, the control system can provoke the movement of the robot 100 for navigation among the positions for picking the target rubber blocks.

In order to properly control the manipulation of the robot 100 and the positioning of the gripper 106 that ensures the secure pickup of the target rubber block, it is necessary to visualize the arrangement of the rubber blocks and identify the target rubber block for pickup. In particular, identifying the outer surface of a target rubber block is relevant to picking up the target rubber block, as well as obtaining a representation of a rubber block as it is picked up and extracted from an arrangement of rubber blocks. With this information, the robot 100 can direct the gripper 106 to the top surface of the target rubber block.

For example, known outer surface patterns of the rubber blocks may be applied along with routing planes and distance transformations to extract lines corresponding to the edges of the outer surface of the target rubber block.

In some embodiments, the robot 100 may take advantage of artificial intelligence (or "AI") based methods and tools to supplement partial information provided by perception. For example, an automatic and adaptive repositioning algorithm may be employed to find an ideal starting position for the robot 100 to pick up a target rubber block. Identifying the target rubber block may incorporate identifying a position where the first accessible rubber block is located in an arrangement of rubber blocks. Machine learning models may use as input one or more images (or other data representations) represented by data from a sensing system of the gripper 106 to generate distances of arranged rubber blocks (e.g., represented as a point cloud) and/or other detections of arranged rubber blocks (e.g., locations of 2D shapes corresponding to rubber blocks).

The location of a target location may be achieved in a manner incorporating the construction of one or more models associated with the locations corresponding to the different sized rubber blocks. In order to create a "black box" related to the rubber blocks, the parameters of the different rubber blocks may be used to form one or more models of picking by the robot 100. This data accumulated in the black box may be used to make decisions regarding picking of individual target rubber blocks by examining the parameters of the target rubber block, the current available picking positions, the historical picking positions, the available positions of the robot 100, the historical positions of the robot 100, and/or the amount of time spent picking rubber blocks that are in a particular arrangement.

In effect, the gripper 106 is able to provide, through external perception of the arranged rubber blocks (e.g., by the rangefinder laser(s) 124), information about the parameters of the target rubber block. This information is relevant to understanding the arrangement and layout of the arranged rubber blocks. Thus, the gripper 106 can pick the best candidate from the arranged rubber blocks so that the robot 100 can extract it from its arrangement and take it to the target location during the picking process performed by the robot 100. This strategy of selecting the best candidate optimizes the picking cycle time.

Once the parameter(s) of the target rubber block are determined, a processor configures the robot 100, and in particular, the gripper 106, based on these parameters to match the pick of the target rubber block to the dimensions of the rubber block. The term "processor" (or, alternatively, the term "programmable logic circuit") refers to one or more devices capable of processing and analyzing data and including one or more software programs for processing the same (e.g., one or more integrated circuits known to the person skilled in the art as being included in a computer, one or more controllers, one or more microcontrollers, one or more microcomputers, one or more programmable logic controllers (or "PLCs"), one or more application-specific integrated circuits, one or more neural networks, and/or one or more other known equivalent programmable circuits). The processor includes software for processing the data captured by the subsystems associated with the robot 100 (and the corresponding data obtained) as well as software for identifying and locating variances and identifying their sources for correction.

Referring again to FIGS. 1 to 10, and further to FIGS. 11 to 13, a detailed description is given as an example of a picking process (or "process") of the invention performed by the robot 100. It is understood that the robot 100 (or a system incorporating the robot 100) can perform the process of the invention in any physical environment without prior knowledge of the environment and without prior knowledge of the arrangement of the rubber blocks.

In initiating a picking process of the invention, the process includes a step of approach of the robot 100, and particularly the gripper 106, toward a target rubber block P* identified for picking (see FIG. 11). During this step, the gripper 106 is controlled to come close to the outer surface $S_{P*}$ of the target rubber block. Simultaneously, the screws 120 rotate in a predetermined direction of rotation to perform retention of the target rubber block P* by the screws.

The picking process further includes a step of determining one or more parameters of a target rubber block P* in an arrangement of rubber blocks (the parameters of the target rubber block P* are shown schematically and are not limited to a particular configuration). The relevant rubber block parameters can be determined, for example, from a reference of rubber block dimensions or generated by an equation (e.g., a calculation of an area of a target rubber block). During this step, a distance D between the extremity 121 of each screw 120 and a top surface $S_{P*}$ of the target rubber block P* is determined by the corresponding laser range finder 124 (see FIG. 11). During this step, the robot 100 may obtain digital image(s) of the rubber blocks arranged in a container to identify the rubber block(s) for picking.

In some embodiments, a camera may capture an image of a portion of the target rubber block P*, where the image of the target rubber block P* may be obstructed by objects in the physical environment (including, without limitation, other rubber blocks, a portion of the gripper 106, an operator(s), a plastic block protection bag, or one or more rail(s)). A determination of the parameters of the target rubber block is performed in both cases: one case being where no obstructions obscure the target rubber block and another case where an obstruction or obstructions (including one of the other rubber blocks arranged with the target rubber block) obscure at least a portion of the target rubber block.

During this step, the robot 100 may use one or more sensors to scan a physical environment containing the arranged rubber blocks, as shown in FIG. 1. The gripping device 102 and/or the elongated arm 104 moves, with one or more sensors on the gripping device and/or elongated arm being able to capture data corresponding to the arranged rubber blocks to determine the shapes and/or positions of the individual rubber blocks.

The picking process further includes a step of retaining the target rubber block P* (see FIG. 12) during which the gripper 106 is put in motion until the extremity 121 of the screw 120 engages a corresponding picking point of the top surface $S_{P*}$ of the target rubber block P*. The movement of the gripper 106 during this step continues until the extremity 121 of the screw 120 pierces the top surface $S_{P*}$ to retain the target rubber block P*. During this step, the laser range finder 124 measures (either continuously or at predetermined intervals) the depth of the piercing performed until an intended piercing depth W is reached. The piercing depth W, which ensures the retention (and thus picking) of the target rubber block P*, is established on the basis of the properties of the rubber block (including, without limitation, its length, width, thickness, viscosity, etc.). The gripper 106 advances the screw 120 until the laser range finder 124 determines that the screw extremity 121 reaches the piercing depth W (determined, for example, by measuring a portion of the height $H_{120}$ of the screw 120 screwed into the rubber block relative to static length L measured between the laser range finder 124 and the extremity 121 of the screw 120). When the extremity 121 of the screw 120 reaches the piercing depth W, the rotation of the screws 120 is stopped to prevent tearing of the retained rubber block.

It is understood that extraction of the target rubber blocks requires the ability to position the gripper 106 at different picking points. Thus, it is understood that picking of a target rubber block or blocks may be accomplished from the center, side or corner of the target rubber block. The gripper 106 is thus capable of extracting a target rubber block by peeling it from a corner, which requires the ability to adjust a positioning angle of the gripper relative to the rubber block targeted for picking (for example, a positioning angle between 0° and 90°).

The picking process further includes a step of extracting the target rubber block P* from the container, during which the retention of the target rubber block P* is maintained. During this step, the load cells 122 determine the weight of the target rubber block(s) picked up by the gripper 106. For this purpose, the load cells 122 take into account the load of the pickup and check whether this load matches the predicted weight of the pickup. Thus, the positioning angle of the gripper 106 and also its speed can be adjusted.

In embodiments of the process of the invention, this step includes a step of vertically pulling the target rubber block P* away from the other rubber blocks arranged in the container. In embodiments of the process of the invention, the vertical pulling of the block includes a peeling step. During this peeling step, in the event that the target rubber block picked up by the gripper is stuck to other rubber block(s) arranged in the container (e.g., by the so-called "suction cup" effect), it is removed (or "peeled") in a direction normal to the outer surface of an adjacent rubber block. The target rubber block P* can be peeled away from the other rubber blocks at any peel angle without reducing the quality of the retention of the target rubber block P* by the screws 120. In embodiments of the process of the invention, the vertical peeling of the block includes a motion control step. During this step, a perpendicular movement of the gripper is made in order to tilt the target rubber block P* picked by the gripper. During this step, the gripper can perform a rotation (either partial or complete) of the target rubber block to ensure a stable orientation of the rubber block without decreasing the retention quality.

Thus, the gripper 106 provides maximum picking efficiency and success regardless of the characteristics of the incoming rubber blocks and containers. The gripper can take a target rubber block by its half, or even with an angle, which allows a peeling effect (the peeling allowing the introduction of air quickly by a side of the picked rubber block that limits the "suction cup effect"). This limitation of extraction effort is even more important at high speed to obtain short cycle times. In addition, the target rubber blocks can be oriented horizontally or vertically, and they can be located in the corners of the container. This ensures that a target rubber block is retained.

The picking process of the invention includes a final step of posing the target rubber block P* in a target location. This step includes a step of transporting the target rubber block P* to the target location, this step being performed by the robot 100. During its transport, the gripper 106 keeps the target rubber block P* properly oriented until it is posed at the target location (see FIG. 13 in which the target location is represented by the crate 200). This step further includes a release step during which the screws 120 rotate in a predetermined direction of rotation to effect release of the target rubber block P* by the screws when the target rubber block is properly posed in the target location.

The posing step also includes an exit step of the gripper 106 that is performed after the target rubber block P* is posed at the target location and simultaneously with the step of releasing the screws 120. During this step, the gripper 106 is set in motion (see arrow A in FIG. 13) until the extremity 121 of the screw 120 exits the top surface $S_{P*}$ of the target rubber block P*. At this point, the rotation of the screws can stop. Movement of the gripper 106 is performed until the gripper exits the target location (e.g., the crate 200 in FIG. 13) to resume a position where the gripper can pick up the next rubber block identified for picking.

A cycle of the picking process of the invention may be done by the PLC control and may include pre-programming of control information. For example, a process setting may be associated with the picking that is provided to the robot 100, including properties of the screws 120, properties of the mixture of the rubber block, and properties of the target location. The robot 100 (and/or a system incorporating the robot 100) can easily repeat one or more steps of the picking process in an order to properly arrange the rubber blocks in the target arrangement.

The robot 100 (and/or a system incorporating the robot 100) may include pre-programming of control information. For example, a process setting may be associated with parameters of typical physical environments in which the robot operates. In embodiments of the invention, the robot 100 (and/or a system incorporating the robot 100) may receive voice commands or other audio data representing, for example, a start or stop in picking up rubber blocks, a start or stop in movement of the robot 100, and/or a manipulation of the gripper 106. The request may include a request for the current state of a cycle of an automatic recognition process. A generated response may be represented audibly, visually, tactilely (e.g., using a haptic interface) and/or in a virtual and/or augmented manner. This response, together with corresponding data, may be entered into in a neural network.

For all embodiments of the robot 100, a monitoring system could be implemented. At least a portion of the monitoring system may be provided in a wearable device such as a mobile network device (e.g., a cell phone, a laptop computer, a network-connected wearable device(s) (including "augmented reality" and/or "virtual reality" devices, network-connected wearables and/or any combinations and/or equivalents).

In an embodiment, the process may include a step of training the robot 100 (or training a system incorporating the robot 100) to recognize values representative of the natures of the rubber blocks (e.g., viscosity values) and to make a comparison with target values (e.g., to make a rubber mixing recipe incorporating the picked rubber blocks). This step may include the step of training the robot 100 to recognize non-equivalences between the compared values. Each training step includes a classification generated by self-learning means. This classification may include, but is not limited to, the parameters of the selected mixing recipes, the screw configurations 120, the durations of the picking process cycles, and the expected values at the end of a cycle in progress (e.g., the weight of the rubber blocks posed at in the target location).

The terms "at least one" and "one or more" are used interchangeably. Ranges that are presented as being "between a and b" include both "a" and "b" values.

Although particular embodiments of the disclosed apparatus have been illustrated and described, it will be understood that various changes, additions, and modifications may be practiced without departing from the spirit and scope of this disclosure. Accordingly, no limitations should be imposed on the scope of the described invention except those set forth in the appended claims.

The invention claimed is:

1. A robot for performing a process of picking rubber blocks arranged in a container toward a target location, the robot comprising:
   a gripping device supported by a pivotable elongated arm and extending from the elongated arm to a free end; and
   a gripper disposed at the free end of the gripping device along a longitudinal axis, the gripper comprising:
      a housing having a predetermined length between an attachment end and a gripping end and including supports that extend between an attachment platform disposed at the attachment end and a functional platform disposed at the gripping end;
      one or more screws installed in the functional platform such that each of the screws can be rotated, each screw having a predetermined height that extends between a bottom portion at the end of the screw, where an extremity of the screw is disposed to pierce an outer surface of a target rubber block, and an opposite top portion; and measuring means for checking a piercing height of a target rubber block relative to at least one screw of the one or more screws when the at least one screw is inserted into the target rubber block during a picking process, wherein the gripper can perform picking of the target rubber block when the robot is set in motion during a picking process.

2. The robot of claim 1, further comprising one or more load cells having the function of weighing the rubber blocks picked up by the gripper during the picking process.

3. The robot of claim 1, wherein the measuring means of the gripper comprises one or more laser range finders that detect the presence or absence of a target rubber block pierced by a corresponding screw and that measure the piercing height by determining the depth of the screw inserted therein.

4. The robot of claim 1, wherein each screw includes a low threaded area on the bottom portion and a high threaded area on the top portion.

5. The robot of claim 1, further comprising at least one motor that controls the speed and direction of rotation of the screws.

6. The robot of claim 1, wherein the attachment end of the gripper comprises an adapter integrated with the attachment platform for removable attachment of the housing to the robot.

7. A process of picking rubber blocks arranged in a container, performed by the robot of claim 1, the process comprising the following steps:

a step of approaching the robot toward a target rubber block identified for picking by the gripper, during which the gripper is controlled to come close to an outer surface of the target rubber block and the screws rotate in a predetermined rotational direction to perform piercing of the target rubber block by the screws;

a step of determining one or more parameters of a target rubber block in an arrangement of rubber blocks;

a step of retaining the target rubber block during which the gripper is continuously moved until the extremity of the screw pierces the outer surface of the target rubber block;

a step of extracting the target rubber block from the container, during which the retention of the target rubber block is maintained, and during which load cells determine the weight of the target rubber block picked by the gripper; and a step of posing the target rubber block in a target location, this step comprising:

a step of transporting the target rubber block to the target location; and a releasing step during which the screws rotate in a predetermined rotational direction to effect release of the target rubber block from the screws when the target rubber block is successfully posed in the target location.

8. The picking process of claim 7, wherein, during the step of retaining the target rubber block, the measuring means measures the depth of the piercing performed until a predetermined piercing depth is reached, at which a stop of the rotation of the screws is performed.

9. The picking process of claim 7, wherein the step of extracting the target rubber block comprises a step of vertically pulling the target rubber block from the other rubber blocks arranged in the container.

10. The picking process of claim 9, wherein the step of vertically pulling the block comprises:

a peeling step, during which the target rubber block retained by the gripper is removed in a direction normal to the outer surface of an adjacent rubber block; and/or a motion control step, during which a perpendicular motion of the gripper is made to tilt the target rubber block retained by the gripper.

11. The picking process of claim 7, wherein the posing step comprises an exit step of the gripper performed after the target rubber block is posed at the target location and simultaneously with the step of releasing the screw.

12. The picking process of claim 7, wherein during the determining step, the parameters of the rubber block are determined from a reference of rubber block dimensions.

* * * * *